(12) United States Patent
Millen et al.

(10) Patent No.: US 11,677,104 B2
(45) Date of Patent: Jun. 13, 2023

(54) FUNCTIONAL SAFETY IN A BATTERY MANAGEMENT SYSTEM

(71) Applicant: SENSATA TECHNOLOGIES, INC., Attleboro, MA (US)

(72) Inventors: Stephen Millen, Coleraine (IE); Luis Espaillat, North Attleboro, MA (US); Jonathan M. Rigelsford, Sheffield (GB); Jing Deng, Belfast (IE)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 641 days.

(21) Appl. No.: 16/776,706

(22) Filed: Jan. 30, 2020

(65) Prior Publication Data

US 2021/0242508 A1 Aug. 5, 2021

(51) Int. Cl.
*H01M 10/48* (2006.01)
*B60L 50/64* (2019.01)
*H01M 10/42* (2006.01)

(52) U.S. Cl.
CPC ........... *H01M 10/48* (2013.01); *B60L 50/64* (2019.02); *H01M 2010/4271* (2013.01); *H01M 2010/4278* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2014/0365065 | A1* | 12/2014 | Leonard | ............ B60L 58/10 701/29.6 |
| 2019/0036946 | A1 | 1/2019 | Ruvio et al. | |
| 2022/0417792 | A1* | 12/2022 | Winder | ............ B60L 58/10 |

OTHER PUBLICATIONS

International Search Report and Written Opinion, PCT/US2021/013044, dated Mar. 30, 2021, 11 pages.

* cited by examiner

*Primary Examiner* — Christopher P Domone
(74) *Attorney, Agent, or Firm* — Mark H. Williams

(57) ABSTRACT

In a particular embodiment, a method of functional safety in a battery management system is disclosed that includes: generating, by a module monitoring system of the battery management system, battery sensor data; generating, by the module monitoring system, based on the battery sensor data, integrity data; sending, by the module monitoring system, via a wireless black communication channel to a wireless network controller of the battery management system, the battery sensor data and the integrity data; and sending, by the wireless network controller, to a vehicle control system, the battery sensor data.

20 Claims, 11 Drawing Sheets

```
┌─────────────────────────────────────────────────────────────────────┐
│ Generate, By A Module Monitoring System Of A Battery Management     │
│ System, Battery Sensor Data 402                                     │
└─────────────────────────────────────────────────────────────────────┘
                                  │
                                  ▼
┌─────────────────────────────────────────────────────────────────────┐
│ Generate, By The Module Monitoring System, Based On The Battery     │
│ Sensor Data, Integrity Data 404                                     │
└─────────────────────────────────────────────────────────────────────┘
                                  │
                                  ▼
┌─────────────────────────────────────────────────────────────────────┐
│ Send, By The Module Monitoring System, Via A Wireless Black         │
│ Communication Channel To A Wireless Network Controller Of The       │
│ Battery Management System, The Battery Sensor Data And The          │
│ Integrity Data 406                                                  │
└─────────────────────────────────────────────────────────────────────┘
                                  │
                                  ▼
┌─────────────────────────────────────────────────────────────────────┐
│ Send, By The Wireless Network Controller, To A Vehicle Control      │
│ System, The Battery Sensor Data 408                                 │
└─────────────────────────────────────────────────────────────────────┘
```

FIG. 4

```
┌─────────────────────────────────────────────────────────────────────┐
│ Generate, By A Module Monitoring System Of A Battery Management     │
│ System, Battery Sensor Data 402                                     │
└─────────────────────────────────────────────────────────────────────┘
                                   │
                                   ▼
┌─────────────────────────────────────────────────────────────────────┐
│ Generate, By The Module Monitoring System, Based On The Battery     │
│ Sensor Data, Integrity Data 404                                     │
└─────────────────────────────────────────────────────────────────────┘
                                   │
                                   ▼
┌─────────────────────────────────────────────────────────────────────┐
│ Send, By The Module Monitoring System, Via A Wireless Black         │
│ Communication Channel To A Wireless Network Controller Of The       │
│ Battery Management System, The Battery Sensor Data And The          │
│ Integrity Data 406                                                  │
└─────────────────────────────────────────────────────────────────────┘
                                   │
                                   ▼
┌─────────────────────────────────────────────────────────────────────┐
│ Validate, By The Wireless Network Controller, Based On The          │
│ Integrity Data, The Battery Sensor Data 502                         │
└─────────────────────────────────────────────────────────────────────┘
                                   │
                                   ▼
┌─────────────────────────────────────────────────────────────────────┐
│ Send, By The Wireless Network Controller, To A Vehicle Control      │
│ System, The Battery Sensor Data 408                                 │
└─────────────────────────────────────────────────────────────────────┘
```

FIG. 5

Generate, By A Module Monitoring System Of A Battery Management System, Battery Sensor Data 402

Generate, By The Module Monitoring System, Based On The Battery Sensor Data, Integrity Data 404

Generating An Identifier Associated With The Module Monitoring System 702

Send, By The Module Monitoring System, Via A Wireless Black Communication Channel To A Wireless Network Controller Of The Battery Management System, The Battery Sensor Data And The Integrity Data 406

Validate, By The Wireless Network Controller, Based On The Integrity Data, The Battery Sensor Data 502

Validate, Based On The Memory Address And A Data Type Of The Battery Sensor Data, The Battery Sensor Data 802

Send, By The Wireless Network Controller, To A Vehicle Control System, The Battery Sensor Data 408

FIG. 8

FUNCTIONAL SAFETY IN A BATTERY MANAGEMENT SYSTEM

BACKGROUND

Electric vehicles are powered by high voltage battery systems including multiple cells. Battery management systems are used to monitor various attributes of the cells, including voltage, temperature, and current, in order to ensure proper and safe operation of the battery. In a conventional wired battery management system, multiple cells of the battery are grouped into modules, with each module having a component to monitor these attributes. Each of these components is wired to a central controller. Problems caused by this solution include lack of flexibility in pack design, wasted space due to connectors and cabling inside the battery pack, and increased challenges for battery second life usage. Though wireless technologies may be used to connect battery monitoring components to a central controller, these wireless technologies are vulnerable to interference from other systems or malicious parties and are also vulnerable to cyber-attacks.

SUMMARY

In a battery management system, a plurality of module monitoring systems may be each configured to monitor various attributes of a battery module. These attributes may be encoded as battery sensor data. Each module monitoring system may encode integrity data for its battery sensor data. Examples of integrity data may include error detection codes, message authentication codes, identifiers, timestamps, etc. Each module monitoring system may encode its battery sensor data and integrity data for transmission as a wireless signal. Each module monitoring system then transmits its battery sensor data and integrity data over a wireless black communication channel to a wireless network controller. The wireless network controller may validate received battery sensor data based on corresponding integrity data and provide the validated battery sensor data to a vehicle control system.

The use of integrity data for the battery sensor data allows the wireless network controller to verify that the battery sensor data has been received unaltered, uncorrupted, and from a valid source (e.g., a module monitoring system). Moreover, the use of black channel wireless communications ensures that no intermediary component between the module monitoring systems and wireless network controllers can modify or corrupt the battery sensor data during transmission. Furthermore, cost and complexity can be reduced by the module monitoring systems only needing to meet ASIL-QM standards, and through the wireless network controller only needing a wireless transceiver integrated circuit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 is a flowchart to illustrate an implementation of a method for functional safety in a battery monitoring system in accordance with the present disclosure;

FIG. 5 is a flowchart to illustrate another implementation of a method for functional safety in a battery monitoring system in accordance with the present disclosure;

FIG. 8 is a flowchart to illustrate another implementation of a method for functional safety in a battery monitoring system in accordance with the present disclosure;

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
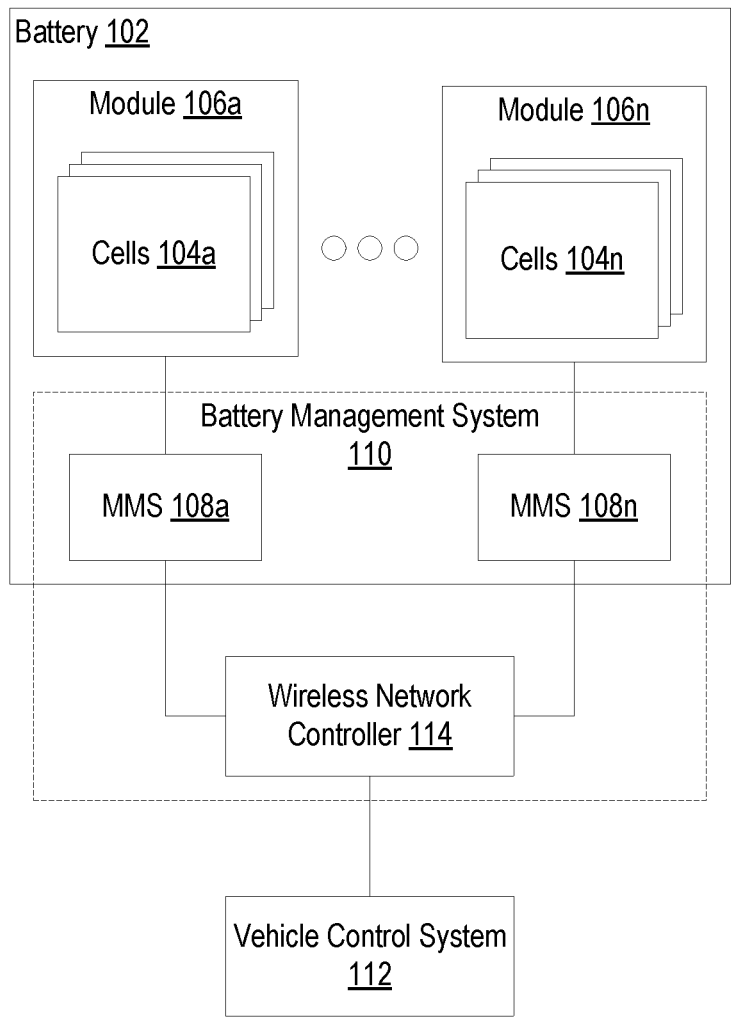
FIG. 1 sets forth a block diagram of a system for functional safety in a battery monitoring system according to embodiments of the present disclosure.

Exemplary methods, systems, apparatuses, and computer program products for functional safety in a battery monitoring system in accordance with the present disclosure are described with reference to the accompanying drawings, beginning with FIG. 1. FIG. 1 sets forth a diagram of a system for functional safety in a battery monitoring system according to embodiments of the present disclosure. The system includes a battery (102), such as a high voltage battery for use in an electric vehicle. The battery (102) includes a plurality of cells (104a-n), such as Lithium-ion (Li-ion) cells. The cells (104a-n) are grouped into modules (106a-n) such that each module (106a-n) comprises a corresponding subset of the cells (104a-n). The cells (104a-n) may be physically grouped into modules (106a-n) using a casing, chassis, or other enclosure. The cells (104a-n) may also be logically grouped into modules (106a-n) by virtue of distinct groupings of cells (104a-n) being monitored by a distinct module monitoring system (108a-n), as will be described below.

The system also includes a battery management system (110). The battery management system (110) monitors various attributes of the cells (104a-n) and provides battery sensor data indicating these attributes to a vehicle control system (112). The battery management system (110) includes a plurality of module monitoring systems (MMS) (108a-n). Each MMS (108a-n) is configured to monitor a corresponding module (106a-n) of cells (104a-n). For example, each module (106a-n) may have a MMS (108a-n) attached to a chassis, base, tray, or other mechanism holding the cells (104a-n) of the module (106a-n). Each MMS (108a-n) includes sensors to measure various attributes of the cells (104a-n) of its corresponding module (106a-n). Such attributes may include voltage, current, temperature, and potentially other attributes. The attributes are indicated in battery sensor data generated by the MMS (108a-n). Each MMS (108a-n) is configured to operate at a particular Automotive Safety Integrity Level (ASIL), such as ASIL-D. As an example, each MMS (108a-n) may be configured to meet, at minimum, ASIL-QM standards, allowing for reduced cost and complexity.

Each MMS (108a-n) encodes its battery sensor data for transmission as a wireless signal and transmits its battery sensor data using a wireless black communication channel to a wireless network controller (WNC) (114) (e.g., a 2.4 Ghz wireless channel). The WNC (114) may be implemented using a wireless transceiver integrated circuit for reduced cost and complexity. The wireless black communication channel has no intervening components between the MMS (108a-n) and WNC (114), preventing faults from being introduced into the battery sensor data from an intermediary communications component. The WNC (114) then sends the battery sensor data received from the MMSes (108a-n) to a vehicle control system (VCS) (112) using a wired or wireless communications channel. The VCS (112) may include a central "computer" of a vehicle. The VCS (112) may be a central control unit or may refer collectively to one or more vehicle subsystems.

Wireless communications in a battery management system (110) are vulnerable to data corruption or interference due to wireless interference from other systems or malicious parties (e.g., signal jamming), and are also vulnerable to cybersecurity attacks. To ensure the security and integrity of wireless communications between the MMS (108a-n) and WNC (114), each MMS (108a-n) generates one or more portions of integrity data for the battery sensor data prior to sending to the WNC (114). The integrity data is sent with the battery sensor data to the WNC (114) (e.g., as a header or separate portion of a data payload). The WNC (114) may then validate received battery sensor data using the integrity data. Through the use of integrity data and black channel wireless communications, the battery management system (110) can achieve functional security and safety while using components of lower cost and complexity (e.g., MMSes (108a-n) meeting ASIL-QM standards, a WNC (114) using a wireless transceiver integrated circuit, etc.).

The integrity data may include an error detection code and/or a message authentication code for the battery sensor data. The error detection code may include, for example, a Cyclical Redundancy Check (CRC), a checksum, a parity bit, a hash code, or other error detection code. The WNC (114) may validate the received battery sensor data by generating the error detection code and comparing the generated value to the error detection code included with the battery sensor data. The message authentication code may include a message authentication code generated by a key. For example, each MMS (108a-n) may share a same key, or each have distinct keys for generating a message authentication code. The WNC (114) may then generate a message authentication code based on the battery sensor data using the appropriate key and compare the generated message authentication code to the received message authentication code.

The integrity data may include an identifier associated with the MMS (108a-n) generating the battery sensor data. The identifier may include a user-defined identifier, serial number, or other unique identifier for a particular MMS (108a-n). The WNC (114) may validate the battery sensor data by comparing the identifier to one or more known identifiers for each MMS (108a-n). The identifier may also include a memory address of the MMS (108a-n) where the battery sensor data was stored prior to sending to the WNC (114). For example, assume that, for a given MMS (108a-n), battery sensor data indicating temperature is stored at one area of memory, battery sensor data indicating voltage is stored at another area of memory, and battery sensor data indicating current is stored at a third area of memory. Each area of memory may be defined by a particular address or range of addresses. The WNC (114) may validate the battery sensor data by comparing the memory address of the identifier and a data type for the battery sensor data (e.g., current data, voltage data, temperature data) to determine if the indicated memory address corresponds to the correct area of memory for that data type.

The integrity data may also include a time stamp (e.g., corresponding to when the battery sensor data was generated or sent to the WNC (114)). The WNC (114) may validate the battery sensor data in response to the time stamp conforming to one or more rules (e.g., occurs after a time stamp for previously received battery sensor data, occurs prior to a current time, etc.). The integrity data may also include a sequence identifier for the battery sensor data. For example, each MMS (108a-n) may maintain a counter that is incremented for each portion of battery sensor data sent to the WNC (114). The counter may be configured to roll over when a particular value or threshold is reached. The WNC (114) may validate the battery sensor data by determining that the sequence identifier is incremented once based on a previously received sequence identifier from the same MMC (108a-n).

To further ensure the integrity and validity of the transfer of battery sensor data, each MMS (108a-n) may be configured to send the battery sensor data according to an ordering of data type transmissions. For example, the MMS (108a-n) may be configured to send battery sensor data in a repeating order of current data, voltage data, and temperature data. The WNC (114) may then validate the battery sensor data by determining that the received battery sensor data conforms to the ordering of data type transmission. For example, assuming the order of data type transmission set forth above, the WNC (114) would validate temperature data if it was received after voltage data, would validate current data if it was received after temperature data, etc. Receiving temperature data after current data may indicate that the voltage data was lost and may need resending, or that the temperature data was sent to the WNC (114) by a malicious third party.

Where the WNC (114) determines that the battery sensor data is invalid, the WNC (114) may request a resending of the battery sensor data from the MMS (108a-n) from which the invalid battery sensor data was received. The MMS (108a-n) may then resend the battery sensor data. The battery sensor data may be sent by another communication channel other than the wireless black communication channel. For example, the battery sensor data may be sent using an optical transmission channel, a power line transmission channel, or another wireless black communication channel operating at a different frequency.

Due to using wireless communications, the battery management system (110) overcomes the disadvantages of wired battery management systems, such as lack of flexibility in pack design and wasted space due to connectors and cabling inside the battery pack. Through the use of black channel communications and layers of data integrity data, the battery management system (110) also overcomes deficiencies in other wireless battery management systems, such as susceptibility to interference, data corruption in communications channels, and attacks by malicious parties.

Figure 2:
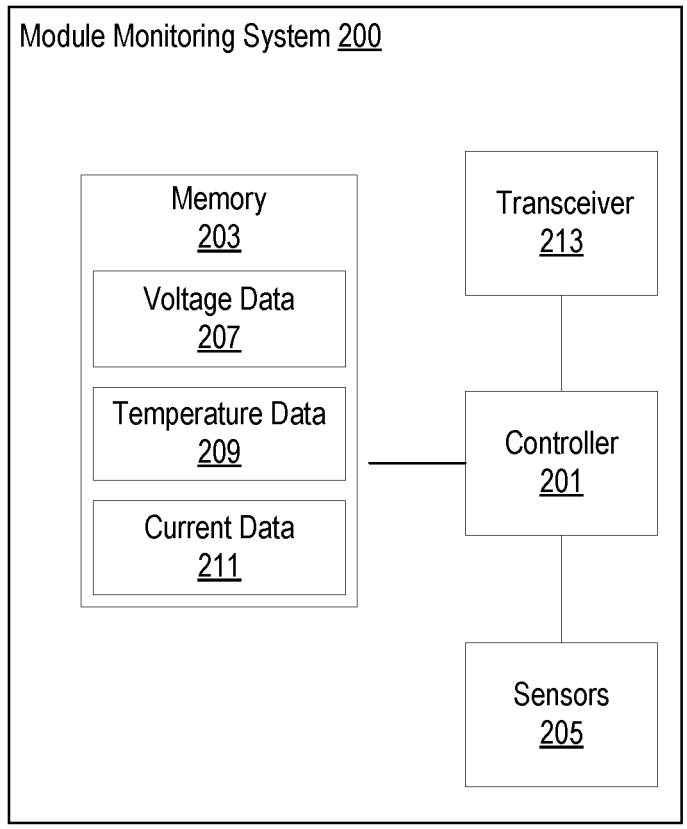
FIG. 2 illustrates a block diagram of a module monitoring system for functional safety in a battery monitoring system according to embodiments of the present disclosure.

For further explanation, FIG. 2 sets forth a block diagram of a module monitoring system (MMS) (200) (e.g., a module monitoring system (108a-n) of FIG. 1) for functional safety in a battery monitoring system according to embodiments of the present disclosure. The MMS (200) includes a controller (201) coupled to a memory (203). The controller (201) is configured to obtain sensor readings from sensors (205) (e.g., voltage sensors, temperature sensors, current sensors) to generate battery sensor data (e.g., voltage data (207), temperature data (209), current data (211)). The controller (201) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (e.g., voltage data (207), temperature data (209), current data (211)) may be stored in the memory (203). The memory (203) may be a non-volatile memory such as flash memory.

The sensors (205) are configured to measure attributes (e.g., voltage, temperature, current) of cells of a module (e.g., cells (104a-n) of a module (106a-n)) on which the MMS (200) is installed. For bidirectional wireless communication with a wireless network controller (e.g., a WNC (114) of FIG. 1), the MMS (200) includes a transceiver (213) coupled to the controller (201).

Figure 3:
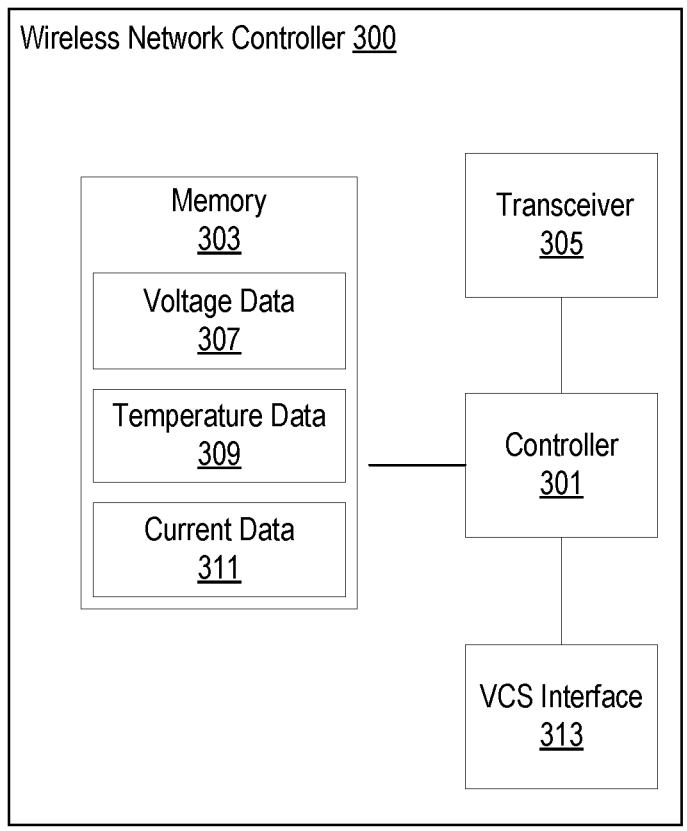
FIG. 3 illustrates a reference diagram of a wireless network controller for functional safety in a battery monitoring system according to embodiments of the present disclosure.

For further explanation, FIG. 3 sets forth a block diagram of a wireless network controller (WNC) (300) (e.g., a wireless network controller (114) of FIG. 1) for functional safety in a battery monitoring system according to embodiments of the present disclosure. The WNC (300) includes a controller (301) coupled to a memory (303). The controller (301) is configured to receive, via a transceiver (305) from a plurality of MMSes (200), sensor data (e.g., voltage data (307), temperature data (309), current data (311)). The controller (301) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (e.g., voltage data (307), temperature data (309), current data (311)) may be stored in the memory (303). The memory (303) may be a non-volatile memory such as flash memory.

The controller (301) is also configured to validate battery sensor data received from an MMS (200) based on integrity data received with the battery sensor data. The controller (301) is further configured to provide validated battery sensor data to a vehicle control system (e.g., a VCS (112) of FIG. 1) via a VCS interface (313). The VCS interface may include a bus or other wired connection to a VCS.

For further explanation, FIG. 4 sets forth a flow chart illustrating an exemplary method for functional safety in a battery monitoring system according to embodiments of the present disclosure that includes generating (402), by a module monitoring system (200) of a battery management system, battery sensor data. The battery sensor data indicates one or more attributes of one or more cells of a module (e.g., cells (104a-n) of a module (106a-n) of FIG. 1) of a battery (e.g., a battery of an electric vehicle). The one or more attributes may include current, temperature, voltage, or other attributes. For example, the MMS (200) may use one or more sensors (205) to measure the one or more attributes and encode, using a controller (201), the measurements into battery sensor data.

The method of FIG. 4 also includes generating (404), by the MMS (200), based on the battery sensor data, integrity data. The integrity data facilitates verification and validation of the battery sensor data when transmitted through the battery management system. In other words, the integrity data ensures that the battery sensor data is transferred uncorrupted and from a verified source. The integrity data may identify the MMS (200) using a unique identifier or message authentication code (MAC). The integrity data may also include one or more error detection codes to determine whether the battery sensor data has been modified or corrupted during transmission. Examples of error detection codes may include hash codes, CRC codes, checksums, parity bits, or other codes. The integrity data may also include sequence identifiers or time stamps to indicate when the battery sensor data was generated or transmitted.

The method of FIG. 4 also includes sending (406), by the MMS (200), via a wireless black communication channel to a wireless network controller (300) of the battery management system, the battery sensor data and the integrity data. Sending (406) the battery sensor data and the integrity data may include encoding the sensor data and the integrity data into a wireless signal for transmission to the WNC (300). For example, a transceiver (213) of the MMS (200) may send the battery sensor data and the integrity data to a transceiver (305) of the WNC (300). The wireless black communication channel is considered a "black channel" in that no other devices or channels are used as intermediaries between the MMS (200) and the WNC (300). Thus, any interference, corruption, or modification to the battery sensor data and/or the integrity data is caused by a source external to the battery management system. The wireless black communication channel may include a 2.4 Ghz wireless channel, or another channel as can be appreciated. The integrity data may be sent as a header for the battery sensor data, or as another component of a data payload sent with the battery sensor data.

The method of FIG. 4 also includes sending (408), by the WNC (300), to a vehicle control system (VCS) (e.g., a VCS (112) of FIG. 1), the battery sensor data. For example, the battery sensor data may be sent using a VCS interface (313) coupling the WNC (300) to the VCS via a wired connection. One skilled in the art would appreciate that the WNC (300) may receive battery sensor data from multiple MMSs (200) corresponding to different modules of a battery and send the sensor data to the VCS.

For further explanation, FIG. 5 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; and sending (408), by the WNC (300), to a vehicle control system (VCS), the battery sensor data.

The method of FIG. 5 differs from FIG. 4 in that the method of FIG. 5 also includes validating (502), by the WNC (300), based on the integrity data, the battery sensor data. Validating (502) the battery sensor data may include determining that the battery sensor data originated from an MMS (200) based on an identifier or message authentication code in the integrity data. Validating (502) the battery sensor data may include determining that the battery sensor data was not corrupted or modified using an error detection code or other value. Validating (502) the battery sensor data may include determining that no battery sensor data was lost or prevented from being transmitted using sequence identifiers or time stamps. Thus, sending (408) the battery sensor data to the VCS is performed in response to successful validation of the battery sensor data.

Figure 6:
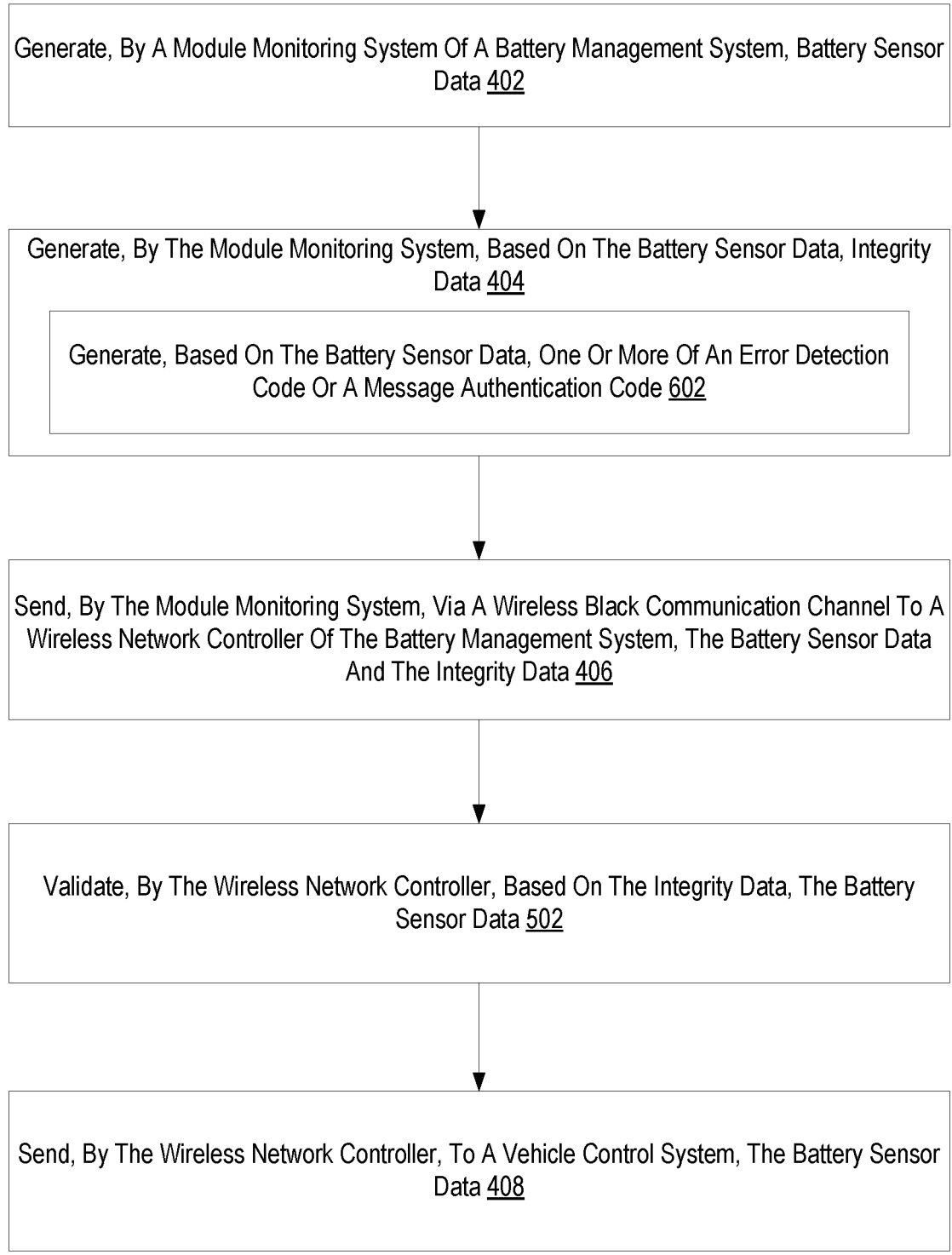
FIG. 6 is a flowchart to illustrate another implementation of a method for functional safety in a battery monitoring system in accordance with the present disclosure.

For further explanation, FIG. 6 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; validating (502), by the WNC (300), based on the integrity data, the battery sensor data; and sending (408), by the WNC (300), to a vehicle control system (VCS), the battery sensor data.

The method of FIG. 6 differs from FIG. 5 in that generating (404), by the MMS (200), based on the battery sensor data, integrity data includes generating (602), based on the battery sensor data, one or more of an error detection code or a message authentication code (MAC). The error detection code may include, for example, a Cyclical Redundancy Check (CRC), a checksum, a parity bit, a hash code, or other error detection code. The WNC (300) may validate (502) the received battery sensor data by generating the error detection code and comparing the generated value to the error detection code included with the battery sensor data. The message authentication code may include a message authentication code generated by a key. For example, each MMS (200) may share a same key, or each have distinct keys for generating a message authentication code. The WNC (300) may then generate a message authentication code based on the battery sensor data using the appropriate key and compare the generated message authentication code to the received message authentication code.

Figure 7:
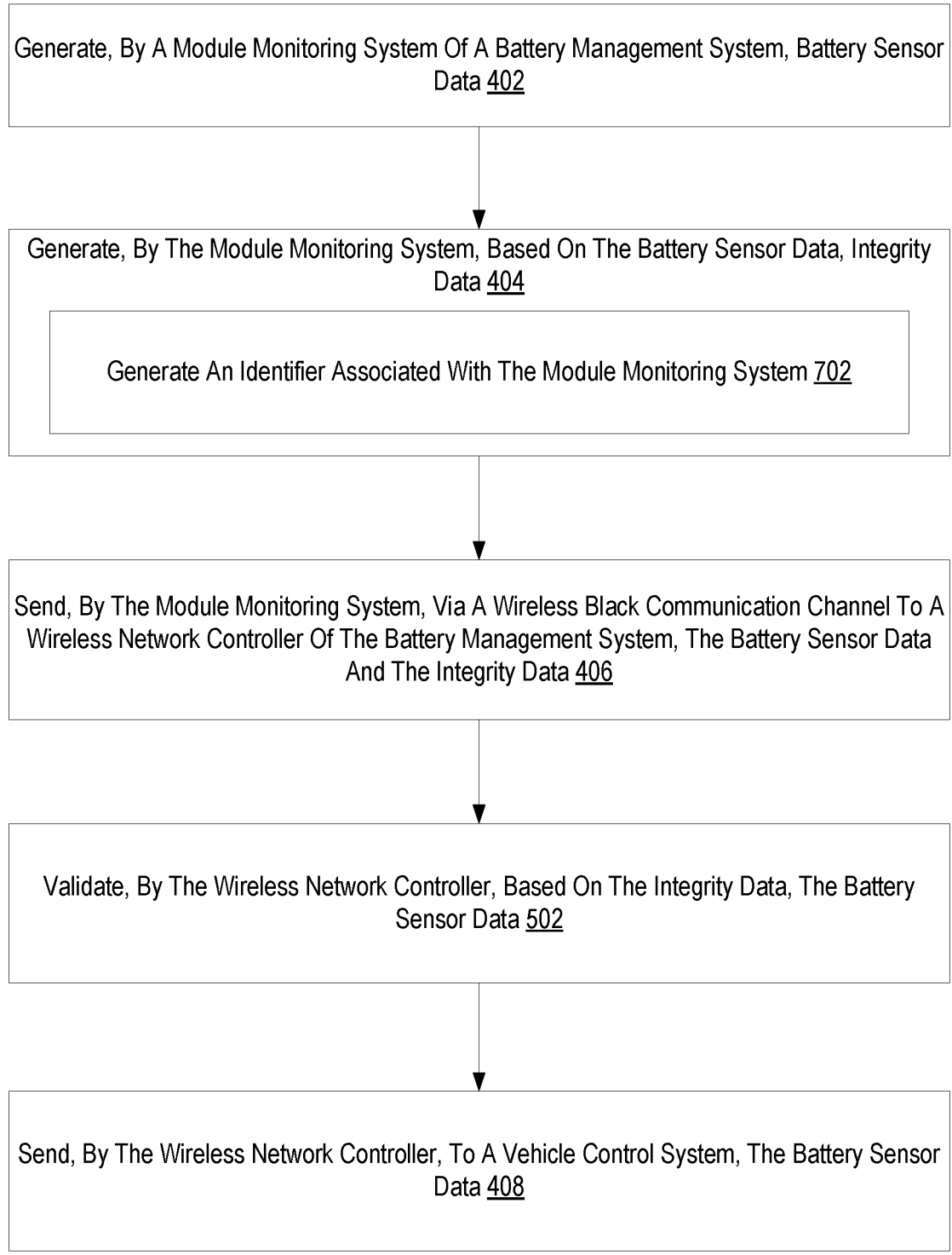
FIG. 7 is a flowchart to illustrate another implementation of a method for functional safety in a battery monitoring system in accordance with the present disclosure.

For further explanation, FIG. 7 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; validating (502), by the WNC (300), based on the integrity data, the battery sensor data; and sending (408), by the WNC (300), to a vehicle control system (VCS), the battery sensor data.

The method of FIG. 7 differs from FIG. 5 in that generating (404), by the MMS (200), based on the battery sensor data, integrity data includes generating (702) an identifier associated with the MMS (200). The identifier may include a user-defined identifier, serial number, or other unique identifier for a particular MMS (200). The battery sensor data may then be validated by comparing the identifier to one or more known identifiers for each MMS (200). The identifier may also include a memory address of the MMS (200) where the battery sensor data was stored prior to sending (406) to the WNC (300).

For further explanation, FIG. 8 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data by generating (702) an identifier associated with the MMS (200); sending (406), by the MMS (200), via a wireless black communication channel to a wireless network controller (300) of the battery management system, the battery sensor data and the integrity data; validating (502), by the WNC (300), based on the integrity data, the battery sensor data; and sending (408), by the WNC (300), to a vehicle control system (VCS), the battery sensor data.

The method of FIG. 8 differs from FIG. 7 in that validating (502), by the WNC (300), based on the integrity data, the battery sensor data includes validating (802), based on a memory address and a data type of the battery sensor data, the battery sensor data. Assume that the identifier includes a memory address of the MMS (200) where the battery sensor data was stored (e.g., in memory (203)) prior to sending to the WNC (300). For example, assume that, for a given MMS (200), voltage data (207) is stored at one area of memory (203), temperature data (209) stored at another area of memory (203), and current data (211) at a third area of memory (203). Each area of memory may be defined by a particular address or range of addresses. In other words, each type of battery sensor data is configured to be stored at a predefined area of memory. Thus, the identifier in the integrity data indicates at which particular area of memory (203) the battery sensor data was stored. Thus, validating (802) the battery sensor data based on the memory address and the data type of the battery sensor data may include comparing the memory address of the identifier and a data type for the battery sensor data (e.g., current data, voltage data, temperature data) to determine if the indicated memory address corresponds to the correct area of memory (203) for that data type.

Figure 9:
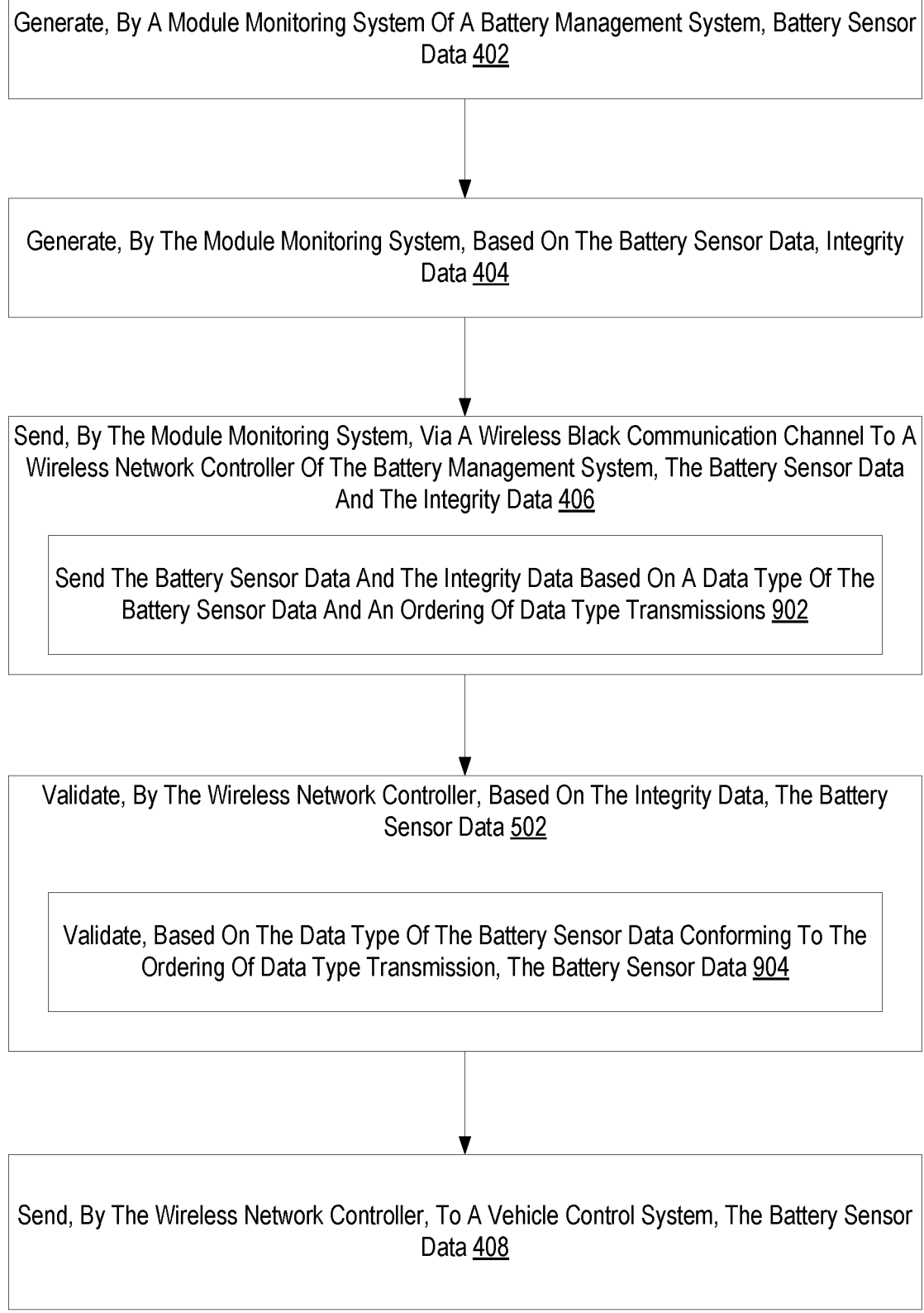
FIG. 9 is a flowchart to illustrate another implementation of a method for functional safety in a battery monitoring system in accordance with the present disclosure.

For further explanation, FIG. 9 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; validating (502), by the WNC (300), based on the integrity data, the battery sensor data; and sending (408), by the WNC (300), to a vehicle control system (VCS), the battery sensor data.

The method of FIG. 9 differs from FIG. 5 in that sending (406), by the MMS (200), via a wireless black communication channel to a WNC (300) of the battery management system, the battery data and the integrity data includes sending (902) the battery sensor data and the integrity data based on a data type of the battery sensor data and an ordering of data type transmissions. For example, the MMS (200) may be configured to send battery sensor data in a repeating order of current data, voltage data, and temperature data. Thus, the portion of battery sensor data sent (902) is dependent on a next data type in the ordering.

The method of FIG. 9 further differs from FIG. 5 in that validating (502) the battery sensor data includes validating (904), based on the data type of the battery sensor data conforming to the ordering of data type transmission, the battery sensor data. For example, assuming the order of data type transmission set forth above, the WNC (300) would validate temperature data if it was received after voltage data, would validate current data if it was received after temperature data, etc. Receiving temperature data after current data may indicate that the voltage data was lost and may need resending, or that the temperature data was sent to the WNC (300) by a malicious third party.

Figure 10:
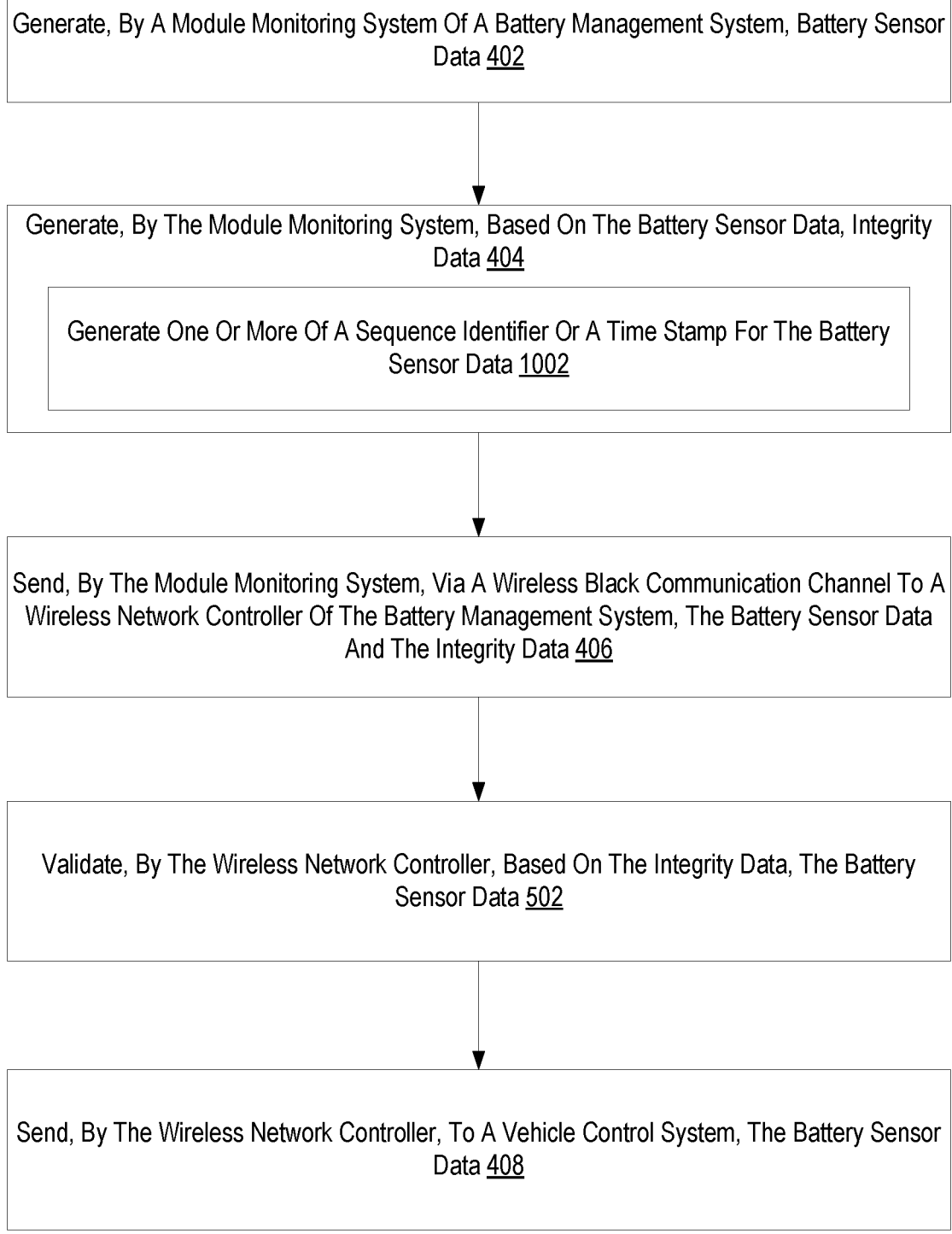
FIG. 10 is a flowchart to illustrate another implementation of a method for functional safety in a battery monitoring system in accordance with the present disclosure.

For further explanation, FIG. 10 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; validating (502), by the WNC (300), based on the integrity data, the battery sensor data; and sending (408), by the WNC (300), to a vehicle control system (VCS), the battery sensor data.

The method of FIG. 10 differs from FIG. 5 in that generating (404), by the MMS (200), based on the battery sensor data, integrity data includes generating (1002) one or more of a sequence identifier or a time stamp for the battery sensor data. For example, a time stamp may indicate when the battery sensor data was generated or sent to the WNC (300)). The time stamp may be validated (502) according to one or more rules (e.g., occurs after a time stamp for previously received battery sensor data, occurs prior to a current time, etc.). The integrity data may also include a sequence identifier for the battery sensor data. For example, each MMS (200) may maintain a counter that is incremented for each portion of battery sensor data sent to the WNC (300). The counter may be configured to roll over when a particular value or threshold is reached.

Figure 11:
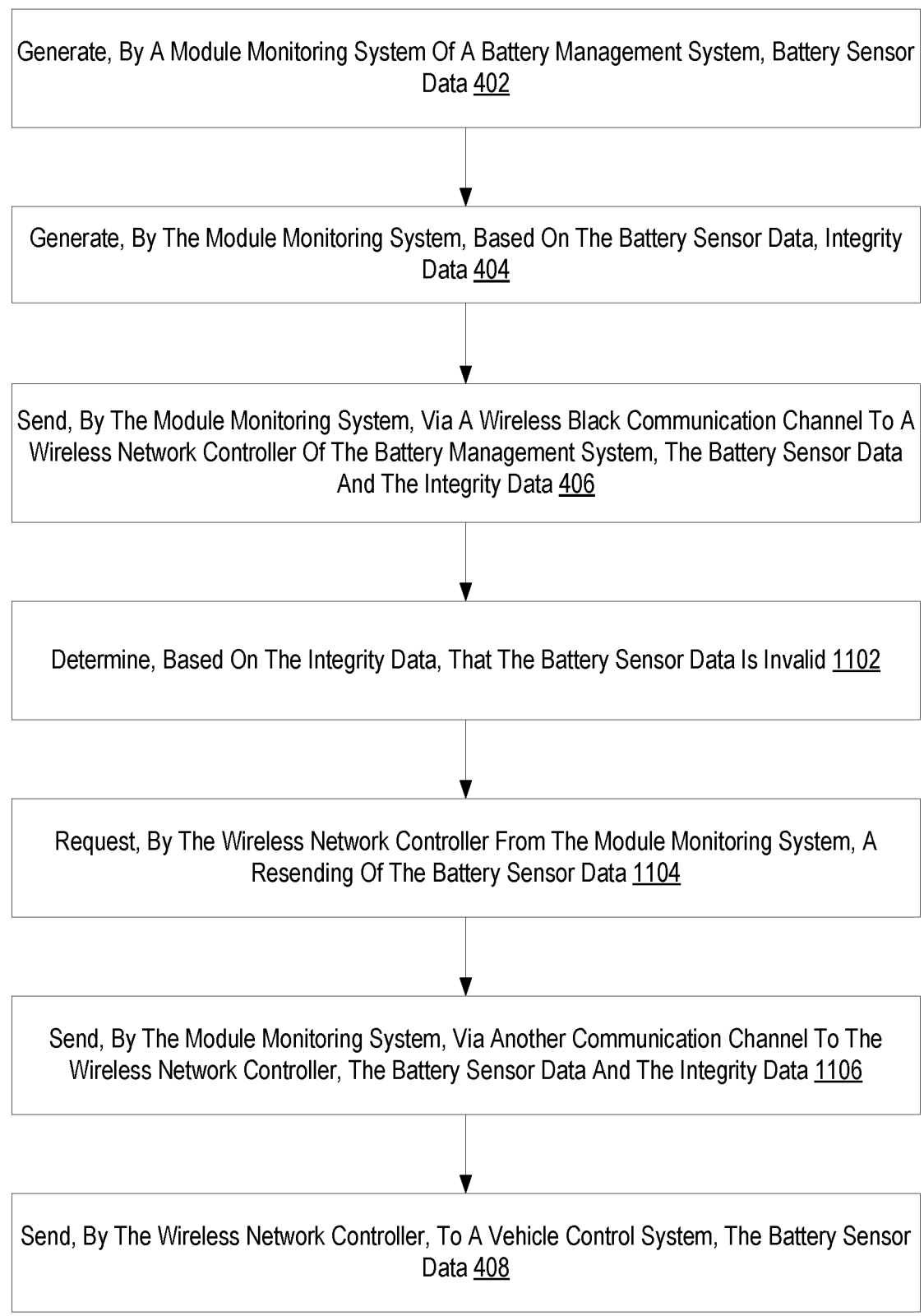
FIG. 11 is a flowchart to illustrate another implementation of a method for functional safety in a battery monitoring system in accordance with the present disclosure.

For further explanation, FIG. 11 sets forth a flow chart illustrating an exemplary method for functional safety in a battery monitoring system according to embodiments of the present disclosure that includes generating (402), by a module monitoring system (200) of a battery management system, battery sensor data; generating (404), by the MMS (200), based on the battery sensor data, integrity data; sending (406), by the MMS (200), via a wireless black communication channel to a wireless network controller (300) of the battery management system, the battery sensor data and the integrity data; and sending (408), by the WNC (300), to a vehicle control system (VCS), the battery sensor data.

The method of FIG. 11 differs from FIG. 4 in that the method of FIG. 11 also includes determining (1102), based on the integrity data, that the battery sensor data is invalid. For example, an error detection code or MAC generated by the WNC (300) may differ from an error detection code included in the integrity data. As another example, the integrity data may include an identifier that does not correspond to a valid MMS (200). As a further example, a timestamp of the integrity data may indicate that the battery sensor data was sent in the future or before a time threshold.

The method of FIG. 11 also includes requesting (1104), by the WNC (300) from the MMS (200), a resend of the battery sensor data. In other words, the WNC (300) requests that the MMS (200) provide a replacement for the invalidated battery sensor data. The method of FIG. 11 also includes sending (1106), by the MMS (200), via another communication channel to the WNC (300), the battery sensor data and the integrity data. For example, the battery sensor data may be sent using an optical transmission channel, a power line transmission channel, or another wireless black communication channel operating at a different frequency.

In view of the explanations set forth above, readers will recognize that the benefits of functional safety in a battery monitoring system according to embodiments of the present disclosure include, but are not limited to:

Improved space usage and configuration of batteries compared to wired battery management systems while maintaining ASIL-D compliance.

Improved protections against data corruption, interference, and attacks when compared to other wireless battery management systems while maintaining ASIL-D compliance.

Exemplary embodiments of the present invention are described largely in the context of a fully functional computer system for functional safety in a battery monitoring system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for functional safety in a battery management system, the method comprising:
generating, by a module monitoring system of the battery management system, battery sensor data;
generating, by the module monitoring system, based on the battery sensor data, integrity data;
sending, by the module monitoring system, via a wireless black communication channel to a wireless network controller of the battery management system, the battery sensor data and the integrity data; and
sending, by the wireless network controller, to a vehicle control system, the battery sensor data.

2. The method of claim 1:
wherein the module monitoring system is one of a plurality of module monitoring systems each configured to monitor a corresponding battery module of a plurality of battery modules; and
wherein the wireless network controller is configured to receive respective battery sensor data from each battery module of the plurality of battery modules.

3. The method of claim 1, further comprising:
validating, by the wireless network controller, based on the integrity data, the battery sensor data; and
wherein sending, to the vehicle control system, the battery sensor data is performed in response to validating the battery sensor data.

4. The method of claim 3, wherein generating the integrity data comprises generating, based on the battery sensor data, one or more of an error detection code or a message authentication code.

5. The method of claim 3, wherein generating the integrity data comprises generating an identifier associated with the module monitoring system.

6. The method of claim 5:
wherein the identifier comprises a memory address of the module monitoring system associated with the sensor data; and
wherein validating the battery sensor data comprises validating, based on the memory address and a data type of the battery sensor data, the battery sensor data.

7. The method of claim 3:
wherein sending, by the module monitoring system, via the wireless black communication channel to the wireless network controller, the battery sensor data and the integrity data comprises sending the battery sensor data and the integrity data based on a data type of the battery sensor data and an ordering of data type transmissions; and
wherein validating the battery sensor data comprises validating, based on the data type of the battery sensor data conforming to the ordering of data type transmission, the battery sensor data.

8. The method of claim 3, wherein generating the integrity data comprises generating one or more of a sequence identifier or a time stamp for the battery sensor data.

9. The method of claim 1, further comprising:
determining, based on the integrity data, that the battery sensor data is invalid; and
requesting, by the wireless network controller from the module monitoring system, a resending of the battery sensor data.

10. The method of claim 9 further comprising sending, by the module monitoring system, via another communication channel to the wireless network controller, the battery sensor data and the integrity data.

11. The method of claim 10, wherein the other communication channel comprises another wireless black communication channel associated with a different frequency than the wireless black communication channel.

12. A battery management system comprising:
a plurality of module management systems each configured to monitor a corresponding battery module of a plurality of battery modules;
a wireless network controller; and
wherein the battery management system is configured to perform steps comprising:
generating, by a module monitoring system of the plurality of battery management systems, battery sensor data;
generating, by the module monitoring system, based on the battery sensor data, integrity data;
sending, by the module monitoring system, via a wireless black communication channel to a wireless network controller of the battery management system, the battery sensor data and the integrity data; and
sending, by the wireless network controller, to a vehicle control system, the battery sensor data.

13. The battery management system of claim 12, wherein the steps further comprise:
validating, by the wireless network controller, based on the integrity data, the battery sensor data; and
wherein sending, to the vehicle control system, the battery sensor data is performed in response to validating the battery sensor data.

14. The battery management system of claim 13, wherein generating the integrity data comprises generating, based on the battery sensor data, one or more of an error detection code or a message authentication code.

15. The battery management system of claim 13, wherein generating the integrity data comprises generating an identifier associated with the module monitoring system.

16. The battery management system of claim 15:
wherein the identifier comprises a memory address of the module monitoring system associated with the sensor data; and
wherein validating the battery sensor data comprises validating, based on the memory address and a data type of the battery sensor data, the battery sensor data.

17. The battery management system of claim 13:
wherein sending, by the module monitoring system, via the wireless black communication channel to the wireless network controller, the battery sensor data and the integrity data comprises sending the battery sensor data and the integrity data based on a data type of the battery sensor data and an ordering of data type transmissions; and
wherein validating the battery sensor data comprises validating, based on the data type of the battery sensor data conforming to the ordering of data type transmission, the battery sensor data.

18. The battery management system of claim 13, wherein generating the integrity data comprises generating one or more of a sequence identifier or a time stamp for the battery sensor data.

19. The battery management system of claim 12, wherein the steps further comprise:
- determining, based on the integrity data, that the battery sensor data is invalid; and
- requesting, by the wireless network controller from the module monitoring system, a resending of the battery sensor data.

20. The battery management system of claim 19, wherein the steps further comprise: sending, by the module monitoring system, via another communication channel to the wireless network controller, the battery sensor data and the integrity data.

\* \* \* \* \*